Patented Apr. 29, 1952

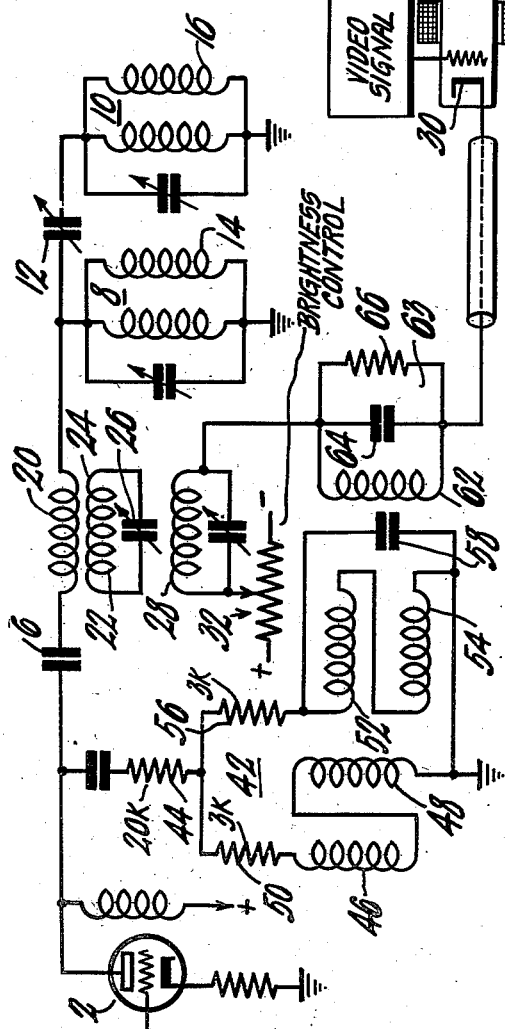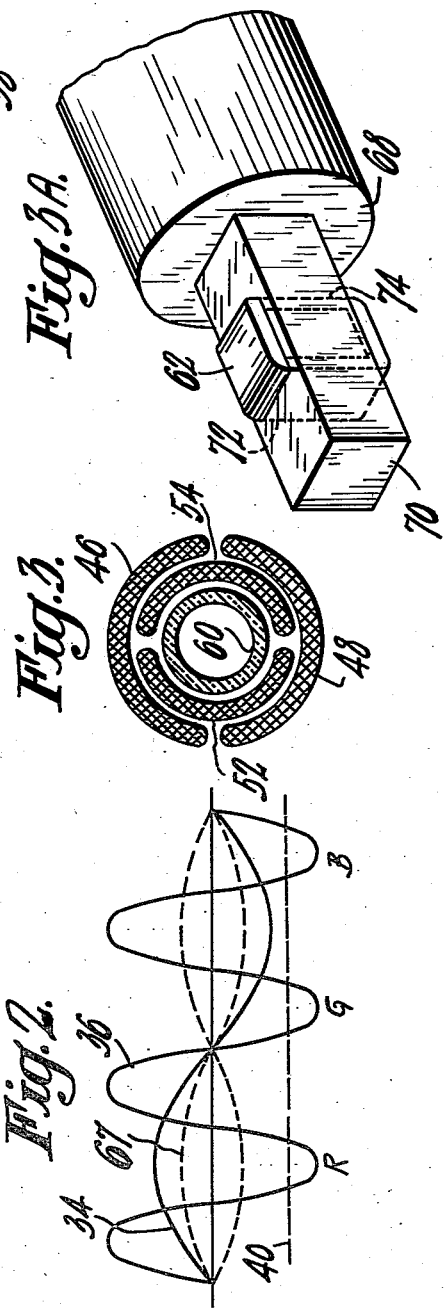
INVENTOR
Vernon D. Landon

2,594,567

UNITED STATES PATENT OFFICE 2,594,567

COLOR TELEVISION

Vernon D. Landon, Princeton, N. J., assignor to Radio Corporation of America, a corporation of Delaware Application September 28, 1950, Serial No. 187,225

8 Claims. (Cl. 315—22)

This invention relates to apparatus for controlling the sampling operation and color balance in cathode ray tubes that are adapted to reproduce multiple colored images with a single beam of electrons.

In order to avoid any difficulties which may arise from the use of a plurality of electron beams, cathode ray tubes for producing colored images have been devised which use only a single gun producing a single electron beam. Where a plurality of guns are used, the intensity of the beam projected by each one can be controlled in accordance with a different component color. However, in a single gun tube it is requisite that the intensity of the single beam sequentially and accurately represent the component colors. A single gun tube of this type has been previously disclosed in the patent application Serial No. 165,552 filed June 1, 1950, in the name of Russell R. Law.

For purposes of convenience, however, a brief description of the operational features of the tube disclosed in the above-identified applications will now be given.

A beam of electrons is projected by a standard electron gun along the principal axis of the cathode ray tube. Means are provided for bending the beam away from the principal axis and then towards the principal axis. The plane in which this bending takes place is then rotated at a predetermined frequency known as the sampling frequency. The sampling frequency rate for dot multiplexing is elemental. For field sequential the rate is at field rate. After the bending operation has been performed, the beam is passed through a means for causing the beam to scan a raster. A directional target of any suitable type is mounted in the path of the scanning beam. This target is so constructed that one component color is produced when the beam approaches from one direction and different component colors are produced when the beam approaches the target from the other directions.

Generally speaking, three component colors are employed. The bending of the beam away from the principal axis causes it to approach this directional target at a constant angle from continuously varying directions. Consequently, the beam impinges upon means for producing each of the component colors in succession.

It will be apparent from a consideration of the tube structure described above that some means must be provided for keying the beam on and off as it is rotated so that it strikes one color phosphor at a time. Otherwise, the beam would straddle two phosphors and produce color dilution in the image.

This may be done by employing an harmonic of the keying or sampling frequency normally used. In a three color tube such as described above, for example, the third harmonic would be used. In the preferred form this third harmonic is inserted in series with the cathode for reasons which will become apparent from a detailed consideration of the circuits involved.

The single gun color tube described above is also capable of reproducing images in black and white. In order to achieve this result, each of the phosphors on the directional screen that produce a different color must provide light of equal brightness for a given beam intensity. Unfortunately, however, this is not always the case as the black and white pictures sometimes appear tinted with one of the component colors. This merely means that the phosphor that produces this color is emitting more light in response to a given beam intensity than the other phosphors emit.

Therefore, it is an object of this invention to provide means for improving the color balance of a single beam color tube.

Briefly, this objective can be attained by controlling the intensity of the beam in accordance with a voltage wave of the fundamental sampling frequency having a properly selected phase. Assume, for example, that the black and white images produced by the tube have a red tint and further, that the red phosphor on the directional target is struck when the sampling frequency employed to rotate the beam has a maximum amplitude. If a suitable amount of this fundamental sampling frequency is applied in such phase as to reduce the intensity when the beam strikes the red phosphor, the red tint can be removed. As will be apparent from a more detailed consideration of this matter, the intensity of the beam will be increased when the beam strikes the green and blue phosphors. A proper balance between all the colors for any given intensity of video signal can be obtained by adjusting the phase of this fundamental with respect to the phase of the sampling frequency employed to rotate the beam.

Another feature of this invention is the provision of sharp sampling and proper color balance in a single gun color tube in such manner that no interference is introduced, either between the harmonic frequency used for obtaining sharp pulses and the fundamental used for color balancing or between either of these signals and the video signals.

Briefly, this last feature of the invention is accomplished by inserting the fundamental sampling frequency and its harmonic into the cathode circuit of the single gun color cathode ray tube.

The way in which the above objectives and advantages may be derived from the use of this invention will become more apparent from a detailed consideration of the drawings in which:

Figure 1 illustrates the circuits employed in accordance with the principles of this invention;

Figure 2 is a graph used in the explanation of the operation of the circuit of Figure 1; and Figures 3 and 3A illustrate the physical arrangement of some of the windings shown in the schematic diagram of Figure 1.

The following details relate to the apparatus for rotating the beam as is done in the patent applications noted above. A voltage wave of sampling frequency is supplied to an amplifier 2 from a source 4. Of course, this voltage wave is carefully synchronized in phase and frequency with the sampling voltage wave at the transmitter. However, the ways and means for effecting such synchronization do not form a part of this invention. After amplification, the sampling sine wave is coupled via a condenser 6 to parallel resonant circuits 8 and 10. The relative phase of the voltage applied to the circuit 8 and to the circuit 10 may be adjusted to some extent by a variable condenser 12. The coils 14 and 16 that form the inductive branches of the parallel resonant circuits 8 and 10 respectively are employed to rotate the beam of electrons previously described.

In order to decrease the time duration of the pulses of electrons projected in the cathode ray tube indicated by the numeral 18, the following structure is added to the conventional structure described immediately above, in accordance with one aspect of this invention. A source of video signals 19 is applied so as to control the intensity of the beam in the cathode ray tube 18.

In series with the condenser 6 and the variable condenser 12, and at a point between the condenser 6 and the tuned circuit 8, there is connected an aperiodic inductance 20. A tank circuit 22, comprised of an inductance 24 and a variable condenser 26, is tuned to an harmonic of the sampling frequency provided by the source 4. As previously noted, when the color tube 18 is adapted to reproduce three different component colors, it is preferable to use the third harmonic of the sampling frequency to sharpen the keying. The inductance 24 is coupled to the inductance 20 and also to an inductance 28 that forms the inductive branch of another parallel resonant circuit tuned to the third harmonic frequency. It will be noted that the tank circuit 28 is connected in series between the cathode 30 of the color tube 18 and a brightness control generally indicated by the numeral 32.

For an explanation of the operation of this part of the circuit of Figure 1, attention is drawn to the graphic illustrations shown in Figure 2 wherein the numeral 34 indicates the sampling wave form derived from the source 4 and the wave form 36 indicates the third harmonic of the sampling frequency provided by the source 4. The third harmonic is inserted in series with the cathode 30 of the cathode ray tube 18. The particular color reproduced by the cathode ray tube 18 at any particular point in the wave form 34 depends upon the relative position of the coils 14 and 16 that serve to rotate the beam and the directional screen 38. For purposes of illustration, however, assume that the electron beam is centered on the red phosphor at a point indicated by the letter R. In this example R is located at the maximum point of the wave form 34. Where three colors are to be reproduced by the tube, the beam will be centered on the green phosphor at a point indicated by G that is displaced by 120°. At a point that is 120° further along the sampling wave 34 the electron beam will be centered on the blue phosphor, as indicated by the letter B. It will therefore be apparent that the third harmonic 36 reaches a negative peak at each point when the beam is centered on each of the different color responsive phosphors. Therefore, when the voltage wave such as 36 is connected in series with the cathode 30, the beam in the cathode ray tube 18 may be turned off except when the voltage applied to the cathode drops below the cut off potential of the tube indicated by the dotted line 40. In this way, the pulses of electrons appearing in the beam are of extremely short duration and each pulse may therefore be made to impinge only on a single phosphor.

The following description relates to the circuitry employed to insure proper color balance in the single gun cathode ray tube 18. The amplified sampling frequency is coupled to a goniometer generally indicated by the numeral 42 via an isolating resistor 44. For reasons that will become apparent as the description proceeds, the lower end of the resistor 44 is coupled to a pair of series connected coils 46 and 48 via resistor 50. In a similar fashion, the lower end of the resistor 44 is also coupled to another pair of series connected coils 52 and 54 via another resistor 56. In parallel with the series coils 52 and 54 there is connected a condenser 58.

The resistance 50 is equal in magnitude to the reactive impedance of the pair of series connected coils 46 and 48. Therefore, the current passing through this pair of coils lags the voltage appearing at the lower end of the resistor 44 by 45°. The reactance of the condenser 58 is equal to the parallel reactance of the two pairs of series coils 46, 48 and 52, 54 and therefore the magnitude of the current flowing in it is twice that of the current flowing in any of the coils. Therefore, the voltage at the lower end of the resistor 56 is equal in magnitude and 90 degrees ahead of the voltage appearing at the lower end of the resistor 50.

In other words, the coils 52 and 54 shunted by condenser 58 form a circuit resonant to a frequency lower than the sampling frequency. Condenser 58 is large enough to tune the combination of 52 and 54 placed in parallel with 46 and 48. Thus, the impedance of path 46, 48 is equal in magnitude to the impedance of the path 58, 52, 54 but of opposite phase. The resistors 50 and 56 also each have a resistance equal in magnitude to the impedance of 46 and 48 in series.

If these two pairs of series coils 46, 48 and 52, 54 are then mounted on a core 60 as indicated by Figure 3, a rotating magnetic field is set up in accordance with principles well known to those skilled in the art.

The beam rotating frequency is combined with the third harmonic of this frequency so as to effect color balance in accordance with the principles of this invention by the following means.

Referring again to Figure 1, there is shown a low Q parallel resonant circuit comprised of an inductance 62, a condenser 64, and a resistor 66. The Q is primarily adjusted by the resistor 66.

The coil 62 is magnetically coupled to the series connected pairs of stator coils 46, 48 and 52, 54 in such a manner that the phase of the fundamental sampling frequency voltage induced in the rotor coil 62 may be varied. A mechanical arrangement for accomplishing this type of coupling is illustrated in Figure 3A. A cylinder 68 of non-conducting material has an outer diameter sufficient to permit a snug fit within the core 60 shown in Figure 3. Emerging along the axis of the cylinder 68 is a rectangular section of insulating material 70 having two holes 72 and 74 bored therethrough as shown. The coil 62 is wound in a flat plane as indicated. By placing the cylinder 68 within the coil form 60 of Figure 3, the rotor coil 62 is magnetically coupled with the stator coils on the outside of the coil form 60. By rotating the cylinder 68, the phase of the voltage induced in the coil 62 with respect to the field that rotates the beam may be suitably varied. The closeness of the coupling can be varied by pushing the cylinder 68 along its axis within the core 60. It will be noticed that the parallel resonant circuit 63 that is comprised of the coil 62 and condenser 64 and resistor 66 is connected in series with the third harmonic frequency supplied by the resonant circuit 28, and is therefore also in series with the cathode 30 of the color reproduction tube 18.

For an explanation of the way in which color balance is achieved for any desired video signal level, attention is again drawn to Figure 2. Assume, for example, that in receiving signals representative of the standard black and white transmission, that the image reproduced appears to have a red tint. This tint can be removed by increasing the intensity of the beam during the time it strikes a red phosphor and by increasing amplitude of the signal during the time the beam strikes the green and blue phosphors. The goniometer shown by the arrangement shown in Figures 3 and 3A can be adjusted so that the voltage induced in the inductance 62 of the resonant circuit 33 has a phase and amplitude such as that indicated by the dotted curve 67 of Figure 2. This voltage appears in series with the cathode 30, and it is positive at the time the red sample is being taken. Therefore, the intensity of the beam is reduced at this time. On the other hand, the voltage represented by the dotted curve 67 is negative during the time the green and blue samples are being taken and accordingly the intensity of the green and blue content of the image is increased.

Actually, the amount of correction brought about by the insertion of the sampling frequency into the cathode circuit is a finite amount for any given longitudinal adjustment of the cylinder 68 within the core 60. If the overall intensity of the image should increase or decrease, the image might again become tinted to a small degree with red. However, it has been found in practice that best results can be obtained by adjusting the amplitude of the corrected voltage wave to compensate for tints appearing at relatively low brightness levels in the image.

It is realized that an accurate correction can be made at only one brightness level. The adjustment chosen must be a compromise between that required at high brightness and that at low brightness.

In the circuit arrangement of Figure 1 it will be noted that the resonant circuit 63 that is resonant to the fundamental sampling frequency has a lower Q due to the presence of the resistor 66. This is to deter the shifting of the phase of the currents in the series-connected stator windings of the goniometer 42 as the result of sampling frequency currents in the rotor coil 62. For the same reason, the stator windings of the goniometer 42 were connected in series with the resistors 50 and 56.

In accordance with another aspect of this invention, interference between the fundamental sampling frequency, inserted into the cathode circuit by the resonant circuit 63, and the harmonic of the sampling frequency, that is inserted into the cathode circuit by the resonant circuit 28, is not objectionable for the following reason. The condenser 64 of the tuned circuit 63 is a low impedance path to the third harmonic of the sampling frequency, and therefore, very little of the third harmonic is inserted back into the stators of the goniometer 42. In a similar fashion, the inductance of the tuned circuit 28 forms a lower impedance path for the fundamental sampling frequency introduced into the cathode circuit by the tuned circuit 63.

It would be possible to insert the fundamental sampling frequency and the harmonic frequency into the grid current rather than into the cathode circuit and to apply the video signal to the cathode resistor of the grid. However, this would require means for adding the fundamental and the harmonic. As another alternative, it would be possible to combine the fundamental sampling frequency and the harmonic of this frequency with the video signal and apply them to either the grid or the cathode. However, this introduces the need for careful isolation of one circuit component from another.

In the present arrangement, no additional equipment is required and the fundamental sampling frequency and its harmonic are adapted to modulate the intensity of the beam as required without presenting any interference problems. For these reasons, the embodiment shown in Figure 1 is to be preferred, although the invention is sufficiently broad in scope to include the modifications just noted.

Having thus described my invention, what is claimed is:

1. Apparatus for controlling the color balance of a cathode ray tube that is adapted to reproduce a colored image with a single beam of electrons, the different colors being successively reproduced as the beam is rotated at a predetermined frequency comprising in combination a goniometer having first and second pairs of coils for generating a rotating magnetic field of sampling frequency, a tuned circuit that is mounted so as to intersect said rotating magnetic field, said tuned circuit being resonant at the frequency of said rotating magnetic field and being movable with respect to said first and second coils, said latter circuit being coupled so as to control the intensity of said beam.

2. An apparatus as described in claim 1 in which said last mentioned coil is mounted so as to be movable along the axis of said rotating field and movable about the axis of said rotating field in such manner as to change the phase as well as the amplitude of the voltage induced in it by the rotating field.

3. Apparatus for controlling in part the variations in intensity of the beam current flowing in a cathode ray tube comprising in combination a source of alternating current energy, means for establishing a rotating magnetic field in response to said alternating current energy, a cathode ray tube having a control electrode for controlling the beam intensity; means for coupling energy induced by said rotating magnetic field to said control electrode; means for deriving an harmonic of said alternating current energy, and means for coupling said harmonic energy to said control electrode.

4. Apparatus as described in claim 3 in which said coupling means are connected in series with the cathode of said cathode ray tube.

5. Apparatus for keying a beam intensity control electrode of a single beam color tube comprising in combination a source of alternating current voltage waves having a frequency with which a single color is to be reproduced, means for establishing a rotating magnetic field in response to said voltage waves, a tuned circuit having an inductance and a condenser connected in parallel, means for placing said inductance within said magnetic field so that a voltage is induced therein by said rotating magnetic field, said inductance and condenser being resonant to the frequency of said rotating magnetic field, and circuit connections for coupling the voltage appearing across said tuned circuit to said beam intensity control electrode.

6. Apparatus as described in claim 5 wherein means are provided for deriving a harmonic of the voltage waves supplied by said source and wherein said means is connected in series with said tuned circuit.

7. Apparatus as described in claim 6 wherein said means has a relatively low impedance to the voltages induced in said tuned circuit by said goniometer and wherein said tuned circuit has a low impedance to the harmonic frequency supplied by said means.

8. Apparatus wherein color images are reproduced by a cathode ray tube having a single rotating electron beam and an electrode for controlling the intensity of each by the combination of a source of voltage waves of beam rotational frequency, a first means for establishing a rotating magentic field, said means being mounted so as to rotate the beam about its axis, an inductance coil coupled between said means and said source, a second means for establishing a rotating magnetic field in response to said voltage waves, a first parallel resonant circuit comprised of a condenser and an inductance connected in parallel, said resonant circuit being tuned to said beam rotational frequency, said inductance being mounted so as to intersect the latter rotating magnetic field, a second resonant circuit comprised of an inductance and a condenser connected in parallel, said latter circuit being resonant to a harmonic of said beam rotational frequency, the inductance of said second resonant circuit being mounted so as to be magnetically coupled to said inductance coil, said first and second parallel resonant circuits being connected in series with the electrode for controlling the beam intensity.

VERNON D. LANDON.

REFERENCES CITED

The following references are of record in the file of this patent:

UNITED STATES PATENTS

| Number | Name | Date |
|---|---|---|
| 2,243,599 | Herbst | May 27, 1941 |
| 2,312,761 | Hershberger | Mar. 2, 1943 |
| 2,400,791 | Tolson et al. | May 21, 1946 |